SYNERGISTIC ANTIHISTAMINE MIXTURE

Filed July 13, 1959

Inventors,
Edwin E. Hays.
John G. Swift.

By Jabel, Baker, York, Jones & Dithmar.

Attorneys.

3,096,241
SYNERGISTIC ANTIHISTAMINE MIXTURE
Edwin E. Hays and John G. Swift, Rochester, N.Y., assignors to Wallace & Tiernan Inc., a corporation of Delaware
Filed July 13, 1959, Ser. No. 826,825
4 Claims. (Cl. 167—65)

The invention relates to a synergistic mixture of antihistamine compounds and particularly to a mixture of antihistamine resinates having advantages in duration and uniformity of action over their single compounds and over other antihistamine mixtures or combinations.

It is now known that sulfonic acid cation exchange resins of proper particle size and cross linkage will form ionic adsorption compounds or complexes with basic drugs including antihistaminics to delay the onset and substantially reduce the toxicity of the adsorbed drug.

We carried out a further investigation to determine experimentally the prolongation of several antihistaminic drug adsorption compounds and to compare the resin adsorption compounds of specific antihistaminic compounds. We also investigated combinations or mixtures of various antihistamine resin adsorption compounds in an attempt to find a superior combination.

One of the antihistamines with which we did considerable work was phenyltoloxamine in the form of its base, soluble salts, and resinates. It was found that we could obtain a medium range, antihistaminic preparation from the sulfonic acid adsorption compound of phenyltoloxamine which had a particle size of approximately 100 mesh to 400 mesh. In the experimental work we used a sulfonic acid cation exchange resin sold under the trademark XE–69. This is a water insoluble sulfonated polymerizate of a polyvinyl aryl compound disclosed in U.S. Patent No. 2,366,007. The product we used had a particle size of between approximately 100 to 200 mesh, and had a cross linkage with divinyl benzene of approximately 8–9 percent. The powdered adsorption compound produced with this resin is sometimes referred to in this specification as a powdered phenyltoloxamine resin complex or resinate.

We then conceived the idea that it would be highly advantageous to combine a medium range antihistaminic, such as the powdered phenyltoloxamine resin complex with a long range antihistaminic. For long range antihistaminics we tried the granular (−20+60 mesh beads) resin complexes (sulfonic acid type) of several highly potent antihistaminics.

A particular object of this invention is to extend the effectiveness of an antihistaminic drug without increasing its dose.

In all cases except one we found that in order to achieve true prolongation using two resinates, a proportionately greater dose of the granular (large bead resinate) had to be used, but in order to keep the total resin dose (as free base) under 90 mgm. per kgm., the dose of powdered phenyltoloxamine resinate had to be reduced to a point of ineffectiveness.

The exception was the mixture of granular size chlorpheniramine sulfonic acid resinate with the powdered phenyltoloxamine sulfonic acid resinate. This combination provided complete and prolonged protection over a period of 25 to 34 hours for guinea pigs in the histamine aerosol tests for the production of experimental asthma in guinea pigs. The mixture in a unit dose of 25 mg. of powdered phenyltoloxamine resinate (as free base) and 6 mg. of granular chlorpheniramine resinate (as free base) produced an effective antiallergic response in patients for periods varying between 8 and 12 hours.

In the accompanying drawing, the duration of action of the combination of the above resinates is compared with the duration of action of their components administered singly.

The test results were run on guinea pigs, using the histamine aerosol technique. Calculations of the median effective times ($ET_{50}$) were made by the method of Litchfield, J. Pharmacol. Exp. Therap., 1949, 97, 399. The $ET_{50}$ has been calculated to be the median duration expressed in hours in which the drug will prevent a severe toxic response in 50 percent of the animals when challenged with a lethal concentration of histamine vapor. The gasp response was used by us as the quantal end point.

The terms "powdered resinate" and "granular resinate" used in the drawing refer specifically to the above mentioned sulfonic acid cation exchange adsorption compounds, having a particle size of 100–200 mesh and 20–60 mesh, respectively (U.S. Standard Screen Series).

It may be noted from the drawing that, when we consider the low doses of each resinate used, there has been an unpredictable prolongation of the $ET_{50}$. The phenyltoloxamine resinate at 45 mgm. per kgm. alone could only be expected to last eight hours, while the chlorpheniramine is ineffective at this level by itself. The result of this combination is so pronounced and so prolonged that it is unquestionably a potentiation effect.

The synergism displayed by the phenyltoloxamine and chlorpeniramine resinates may either be a quantative potentiation of drug effect or a potentiation of the duration of drug action, or both. In either case, the end result is a combination of increased efficacy and duration without an increased toxic liability due to a multiplication of the proportion of active drug in the dosage form.

Our discovery is particularly important for the particular combination of powdered phenyltoloxamine resinate with granular chlorpheniramine resinate in that this gives the best long-acting antihistamine combination known to us. However, our discovery of the synergistic effect goes beyond the mixture of these particular resinates. It applies to any mixture of phenyltoloxamine and chlorpheniramine, since any amount, such as from one percent to 99 percent, of chlorpheniramine with the phenyltoloxamine is a synergistic improvement over the single compound. The drugs may be present as free base, maleate, chloride, phosphate, or other soluble salt form, or as the resinate, even including, although not preferred, the carboxylic acid cation resin adsorbates.

For maximum prolongation with effectiveness, a mixture of the phenyltoloxamine base, salt or resinate, with a sulfonic acid cation exchange resin adsorption compound of chlorpheniramine having a particle size such that at least 90 percent is retained on a 40 mesh screen is preferred, with a divinyl benzene or like cross linkage of 5 percent to 10 percent. However, improved results over the soluble salts and base are obtained with any particle size and any percent cross linkage of sulfonic acid cation exchange adsorption compound, and synergistic results over the phenyltoloxamine alone are obtained with the chlorpheniramine chloride, sulfate, or other soluble salt, and to a slight extent with the base.

Instead of using a coarse particle size (+40 mesh) chlorpheniramine sulfonic acid resin adsorption compound of 5 to 10 percent cross linkage to obtain a slow sustained release of the chlorpheniramine, we can use a fine particle size (−100 to +400) sulfonic acid resin adsorption compound having a cross linkage of 10 to 20 percent. In fact, a suitable slow release chlorpheniramine sulfonic acid resin complex can be made by varying the particle size and cross linkage of the sulfonic acid cation exchange resin and hence also of the adsorbate, so that the adsorbate will release not more than 50 percent of the chlorpheniramine by one hour contact of the resin complex with .1 N hydrochloric acid, with preferably at least 10 percent released in three hours.

The proportions of chlorpheniramine and phenyltoloxamine can be varied widely. A potentiating amount of chlorpheniramine to give a greater than additive effect can be one percent and even lower. However, with the preferred mixtures of granular chlorpheniramine resinate with powdered phenyltoloxamine resinate formed with sulfonic acid cation exchange resin, suitable proportions of resinate are 10 percent to 60 percent by weight of chlorpheniramine with 90 percent to 40 percent of phenyltoloxamine, a particularly satisfactory composition containing about 4.5 parts by weight of phenyltoloxamine powdered resinate with one part by weight of chlorpheniramine granular resinate.

The dosage amount for the above resinates is from about .5 to 50 mg. of chlorpheniramine and from 2 to 100 mg. of phenyltoloxamine.

The antihistamine resinates can be readily made by mixing the antihistamine base with an aqueous suspension of a sulfonic acid cation exchange resin in hydrogen form, and stirring for several hours until the reaction is completed. The reaction is simply that of an acid (the sulfonic acid resin) and a base (the antihistamine), and the product is a salt, or resinate, although terms such as resin complex or resin adsorption compound are sometimes used.

A suitable resinate contains from about 10 percent to 25 percent antihistamine base. It may contain less than 10 percent, but this gives an impractical, high amount of unreacted resin. An amount of 25 percent is about saturation for the compound, although more may be present as free or mechanically adsorbed antihistamine.

An illustrated formula of a suitable phenyltoloxamine sulfonic acid cation exchange resinate or complex (a sulfonic acid cation exchange resin having a phenyltoloxamine cation adsorbed thereon) is as follows:

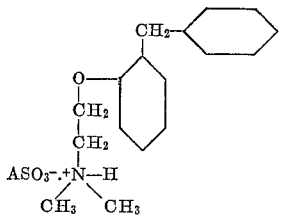

where A is a resin nucleus of a sulfonic acid cation exchange resin.

The antihistamine compounds are mixed in suitable proportions and also can be mixed with various other ingredients. Pharmaceutically acceptable carriers are generally present.

An example of a suitable composition is given below:

*Example I*

25 mg. phenyltoloxamine base as a phenyltoloxamine sulfonic acid cation exchange resinate or 62.70 mg. resinate of 39.9% drug assay. (Particle size: −100+200 mesh [U.S. standard screen size], cross linkage 7.5%)
6 mg. chlorpheniramine base as a chlorpheniramine sulfonic acid cation exchange resinate or 23.05 mg. resinate of 26.0% drug assay. (Particle size: −20+40 mesh, cross linkage 7.5%)
421.05 mg. dicalcium phosphate
10.0 mg. magnesium stearate The above formula is the preferred composition. However, the percent of bound drug as drug base can vary widely from partially reacted to fully saturated. The phenyltoloxamine resinate can suitably have from 10 percent, and lower, to about 43 percent by weight of bound phenyltoloxamine, and the chlorpheniramine resinate can range from 10 percent, and lower, to about 28 percent of bound chlorpheniramine. Furthermore, various other well-known pharmaceutical carriers and excipients may be present, or the resinates used by themselves without additional ingredients. The above compositions may be used in tablet form or in capsules.

The specific resinates used in the above example were made by reacting the base drug with the sulfonic acid cation exchange resin disclosed in Example 1 of Patent No. 2,366,007, except that 7.5 parts of divinyl benzene were used instead of 10 parts. Such a resin is a sulfonated polymerizate of a polyvinyl aryl compound, or more specifically a sulfonated polystyrene-divinyl benzene copolymer. Of course, as above pointed out, other sulfonic acid cation exchange resins may be used, such as those disclosed in United States Patents Nos. 2,204,539; 2,228,159; and 2,729,607.

While certain embodiments of the invention have been described, many modifications thereof may be made without departing from the spirit of the invention; and it is not wished to be limited to the detailed examples, formulas, and proportions of ingredients herein set forth. It is desired to be limited only as required by the appended claims.

We claim:
1. An antihistaminic composition comprising a mixture of a substance of the group consisting of phenyltoloxamine base, soluble salts of phenyltoloxamine, and cation exchange resinates of phenyltoloxamine, and a substance of the group consisting of chlorpheniramine base, soluble salts of chlorpheniramine, and cation exchange resinates of chlorpheniramine, the chlorpheniramine compound being present with the phenyltoloxamine compound in potentiating amount sufficient to give substantial increased duration of effectiveness to the composition.

2. The composition of claim 1 wherein the chlorpheniramine compound is present with the phenyltoloxamine compound in from 1 percent to 99 percent of the mixture of such substances.

3. An antihistaminic composition consisting essentially of from 90 percent to 40 percent by weight of particles of a phenyltoloxamine sulfonic acid cation exchange resinate having a particle size of at least approximately 100 mesh and a cross linkage of 5 percent to 10 percent, and from 10 to 60 percent of a chlorpheniramine sulfonic acid cation exchange resinate having a particle size such that at least 90 percent of the particles are retained on a 40 mesh screen, and a cross linkage of 5 to 10 percent.

4. An antihistaminic composition consisting essentially from 10 to 60 percent by weight of particles of chlorpheniramine sulfonic acid cation exchange resinate, having a particle size and cross linkage such that not more than 50 percent of the chlorpheniramine will be released on contact with .1 N hydrochloric acid for one hour, and from 90 to 40 percent of particles of a phenyltoloxamine sulfonic acid cation exchange resinate having a particle size and cross linkage such that substantially more of the phenyltoloxamine will be released by contact with .1 N hydrochloric acid for one hour than the chlorpheniramine from its resinate.

References Cited in the file of this patent

UNITED STATES PATENTS

| | | |
|---|---|---|
| 2,766,174 | Foley et al. | Oct. 9, 1956 |
| 2,768,115 | Buckwalter et al. | Oct. 23, 1956 |
| 2,768,207 | Cheney et al. | Oct. 23, 1956 |
| 2,793,979 | Svedres et al. | May 28, 1957 |
| 2,895,880 | Rosenthal | July 21, 1959 |
| 2,918,411 | Hill | Dec. 22, 1959 |
| 2,919,230 | Thurmon | Dec. 29, 1959 |
| 2,921,883 | Reese et al. | Jan. 19, 1960 |
| 2,951,792 | Swintosky | Sept. 6, 1960 |

(Other references on following page)

| | | |
|---|---|---|
| 2,990,332 | Keating | June 27, 1961 |
| 2,993,836 | Nash et al. | July 25, 1961 |
| 2,996,431 | Barry | Aug. 15, 1961 |

FOREIGN PATENTS

| | | |
|---|---|---|
| 759,577 | Great Britain | Oct. 17, 1956 |

OTHER REFERENCES

American Academy of Allergy, J. Allergy, Vol. 28, No. 5, September 1957, pp. 467–468.

Current Therapy, 1959, W. B. Saunders Co., Phila., Pa., 1959. Received in POSL July 6, 1959, pp. 56, 399, 400, 401, 403, 410, 430, 469 (Chlorprophenpyridamine), pp. 397, 399 (Antihistamine Utilities).

Walpole et al.: "The Evaluation of Drug Toxicity," Little, Brown & Co., Boston, Mass. (1958), pp. 48–75.

Berger: Ann. N.Y. Acad. Sci., Vol. 66, pp. 686–94 (1957).

Berger: Ann. N.Y. Acad. Sci., Vol. 67, pp. 685–700 (1957).

Hodges: Brit. Med. J., Vol. 1, p. 648 (1957).

"Naldecon" (Bristol), TM. 692,726, registered Feb. 9, 1960 (date of first use in commerce—April 7, 1959).

Swift: "Sustained Ionic Release of Antihistaminics," in Federation Proceedings, Vol. 17, No. 1, Part I, p. 414, March 1958.

"Tristacomp" (Physicians'), T.M. 711,135, registered Feb. 14, 1961 (date of first use in commerce—Nov. 18, 1959).

"Syndecon" (Bristol), T.M. 702,828, registered Aug. 16, 1960 (date of first use in commerce—Jan. 8, 1960).

"Algic" (Spencer), T.M. 718,132, registered July 11, 1961 (date of first use in commerce—May 9, 1960).